(12) United States Patent
Medhat et al.

(10) Patent No.: US 7,961,611 B1
(45) Date of Patent: Jun. 14, 2011

(54) SYSTEM AND METHOD FOR TRAFFIC ALLOCATION

(75) Inventors: Khalid Mohamed Medhat, Overland Park, KS (US); Krishnakumar Ponnath, Overland Park, KS (US); Pierce Andrew Gorman, Lee's Summit, MO (US); Robert E. Geis, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 170 days.

(21) Appl. No.: 12/485,102

(22) Filed: Jun. 16, 2009

(51) Int. Cl.
*G01R 31/08* (2006.01)
*H04J 3/16* (2006.01)
*H04W 40/00* (2009.01)
*H04B 7/00* (2006.01)

(52) U.S. Cl. ........ 370/230; 370/231; 370/232; 370/234; 370/235; 370/468; 455/445; 455/522

(58) Field of Classification Search .......... 370/230–235, 370/468; 455/445, 522
See application file for complete search history.

(56) References Cited

U.S. PATENT DOCUMENTS

| 7,609,818 | B2 * | 10/2009 | Doskow et al. | 379/32.03 |
| 2004/0229621 | A1 * | 11/2004 | Misra | 455/445 |
| 2006/0120282 | A1 * | 6/2006 | Carlson et al. | 370/229 |
| 2008/0279183 | A1 * | 11/2008 | Wiley et al. | 370/389 |
| 2009/0323544 | A1 * | 12/2009 | Gaddis et al. | 370/252 |

* cited by examiner

*Primary Examiner* — Huy D Vu
*Assistant Examiner* — Brandon Renner

(57) ABSTRACT

A method for operating a control module to allocate traffic exchanges between an intermediate network and a plurality of carrier networks in a communication system is provided. The method includes monitoring first traffic transferring from the intermediate network to a first carrier network to determine an amount of outbound traffic, and monitoring second traffic transferring from the first carrier network to the intermediate network to determine an amount of inbound traffic. The method also includes determining a supplemental amount based on the amount of outbound traffic and the amount of inbound traffic, and transmitting a control message that identifies the supplemental amount to a second carrier network instructing the second carrier network to transfer supplemental traffic in an amount less than or equal to the supplemental amount.

9 Claims, 5 Drawing Sheets

US 7,961,611 B1

SYSTEM AND METHOD FOR TRAFFIC ALLOCATION

TECHNICAL BACKGROUND

Carrier networks are very expensive to build and maintain, thus carriers work together to allow connectivity between devices on each others' different carrier networks. For example, two carriers may agree to carry an amount of traffic over their networks for each other. This allows each carrier to transfer traffic to devices on each other's networks automatically.

Often these agreements describe a balance of traffic between the two carrier networks. For example, the agreement may allow each carrier to transfer a set quantity of traffic over the other carrier's network. This quantity of traffic is often equal so that each carrier handles the same amount of external traffic. However, when one carrier transfers much more traffic than the other carrier, even if below the set quantity, an imbalance in traffic amounts occurs, causing one carrier to handle much more traffic than the other.

Overview

A method for operating a control module to allocate traffic exchanges between an intermediate network and a plurality of carrier networks in a communication system is provided. The method includes monitoring first traffic transferred from the intermediate network to a first carrier network to determine an amount of outbound traffic, and monitoring second traffic transferred from the first carrier network to the intermediate network to determine an amount of inbound traffic. The method also includes determining a supplemental amount based on the amount of outbound traffic and the amount of inbound traffic, and transmitting a control message that identifies the supplemental amount to a second carrier network instructing the second carrier network to transfer supplemental traffic in an amount less than or equal to the supplemental amount.

A communication system for allocating traffic between an intermediate network and a plurality of carrier networks is provided. The communication system includes a control module, a first gateway coupled with the control module, an intermediate network and a first carrier network, and a second gateway coupled with the control module, the intermediate network and a second carrier network.

The control module is configured to monitor first traffic transferred from the intermediate network to the first carrier network through the first gateway to determine an amount of outbound traffic, and monitor second traffic transferred from the first carrier network to the intermediate network through the first gateway to determine an amount of inbound traffic. The control module is also configured to determine a supplemental amount based on the amount of outbound traffic and the amount of inbound traffic, and to transmit a control message that identifies the supplemental amount to the second carrier network instructing the second carrier network to transfer supplemental traffic in an amount less than or equal to the supplemental amount through the second gateway to the intermediate network.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
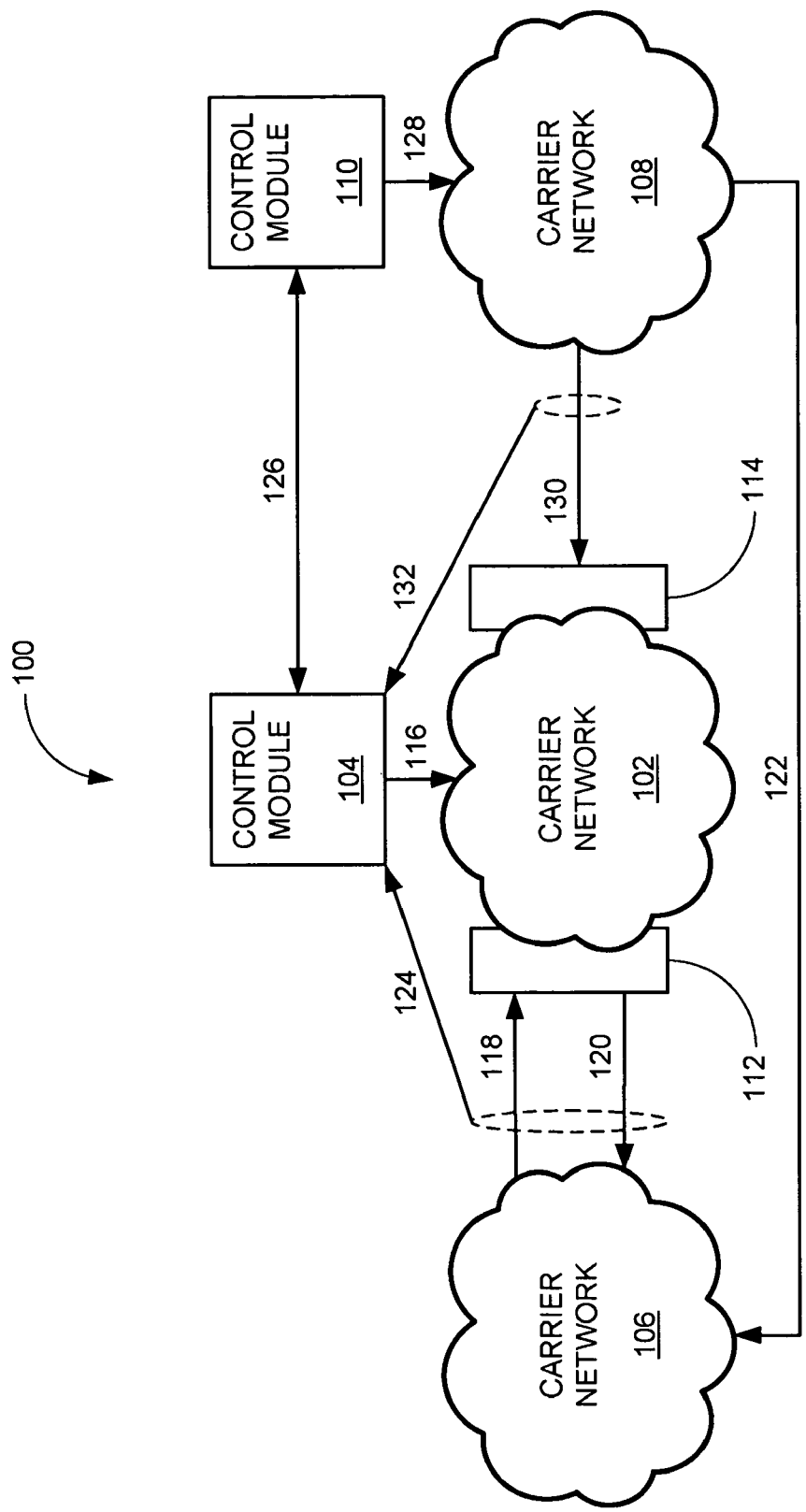
FIG. 1 illustrates a communication system.

FIG. 1 illustrates communication system 100. Communication system 100 includes carrier network 102, carrier network 106, carrier network 108, control module 104, and control module 110. Gateway 112 and gateway 114 are associated with carrier network 102. Information from carrier network 102 to carrier network 106 travels through gateway 112 and link 120. Information from carrier network 106 to carrier network 102 travels through link 118 and gateway 112. Information from carrier network 108 to carrier network 102 travels through link 130 and gateway 114. Information from carrier network 108 to carrier network 106 travels through link 122.

Control module 104 is coupled to carrier network 102 through link 116. Control module 110 is coupled to carrier network 108 through link 128. Control module 104 is coupled to control module 110 through link 126. Links 116, 126, and 128 could use various communication media, such as air, metal, optical fiber, or some other signal propagation path—including combinations thereof. These links could be direct links or they might include various intermediate components, systems, and networks.

Links 118, 120, 122, and 130 are high-speed, high-capacity, carrier-grade trunk lines interconnecting peering carrier networks 102, 106, and 108. These high-performance connections may use various communication media, such as air, metal, optical fiber, or some other signal propagation path—including combinations thereof. They may be direct links, or they might include various intermediate components, systems, and networks. In some embodiments, these links are, or occur at internet exchange points (IX or IXP) and may include one or more network switches.

In this example, carrier network 102, carrier network 106, and carrier network 108 are all owned or operated by different carrier entities. The operators of carrier network 102 and carrier network 106 have a peering agreement in place such that carrier network 106 will handle a given quantity of traffic from carrier network 102, and in return, carrier network 102 will handle a similar amount of traffic from carrier network 106. This allows both carriers flexibility in sending and receiving traffic over each other's networks.

Control module 104 monitors traffic between the different carrier networks through monitors 124 and 132. Monitor 124 detects the volume of traffic flowing between carrier network 102 and carrier network 106, while monitor 132 detects the volume of traffic flowing from carrier network 108 to carrier network 102. In some examples, this monitoring may actually occur in gateways 112 and 114.

In some circumstances, an imbalance in carrier traffic flowing between carrier networks may occur. For example, if carrier network 102 is handling 4 Gigabytes/second of traffic from carrier network 106 while sending only 1 Gigabyte/ second of traffic to carrier network 106, there is a traffic gap of 3 Gigabytes/second that carrier network 102 may fill without additional cost according to the agreement. In this case the operators of carrier network 102 will look to balance the traffic flowing between carrier network 106 and carrier network 102 by increasing the amount of traffic flowing to carrier network 106.

One way to balance this traffic is to route traffic delivered from a third party to carrier network 106 as part of the traffic from carrier network 102. In such a case, the operators of carrier network 102 may send a request to the operators of carrier network 108 encouraging them to provide traffic for carrier network 106 through carrier network 102. This request may be transmitted by control module 104 for carrier network 102 to control module 110 for carrier network 108 over link 126.

In detail, monitor 124 monitors traffic transferred from carrier network 102 (also called the intermediate network) to carrier network 106 (also called the first network) over link 120 to determine an amount of outbound traffic. Monitor 124 also monitors traffic transferred from carrier network 106 (the first network) to carrier network 102 (the intermediate network) over link 118 to determine an amount of inbound traffic. Control module 104 then determines a supplemental amount of traffic based on the amount of inbound traffic and the amount of outbound traffic. In one example, this supplemental amount may be thought of as a traffic gap corresponding to the difference between the amount of inbound traffic and the amount of outbound traffic. In other examples control module 104 may calculate the supplemental amount in any of a wide variety of methods with the goal of balancing the inbound and outbound traffic. In some examples, control module 104 may calculate the supplemental amount as a bandwidth, while other examples may express the supplemental amount as a quantity of data.

Still other examples may not seek to actually balance the inbound traffic with the outbound traffic. For example, situations may exist where the peering agreement between the two carriers calls for an unbalanced exchange of traffic. In such a case, the supplemental amount would be related to the amount of additional outbound traffic required to maximize the amount of outbound traffic as allowed by the agreement.

Once the supplemental amount has been determined, control module 104 transmits a control message identifying the supplemental amount to control module 110, instructing the operator of carrier network 108 to transfer supplemental traffic in an amount less than or equal to the supplemental amount to carrier network 102 for forwarding to carrier network 106. This reduces the amount of traffic carried over link 122 and increases the amount of traffic carried over links 120 and 130. Control module 104 also may monitor the traffic flowing from carrier network 108 to carrier network 102 over link 130 via monitor 132.

Figure 2:
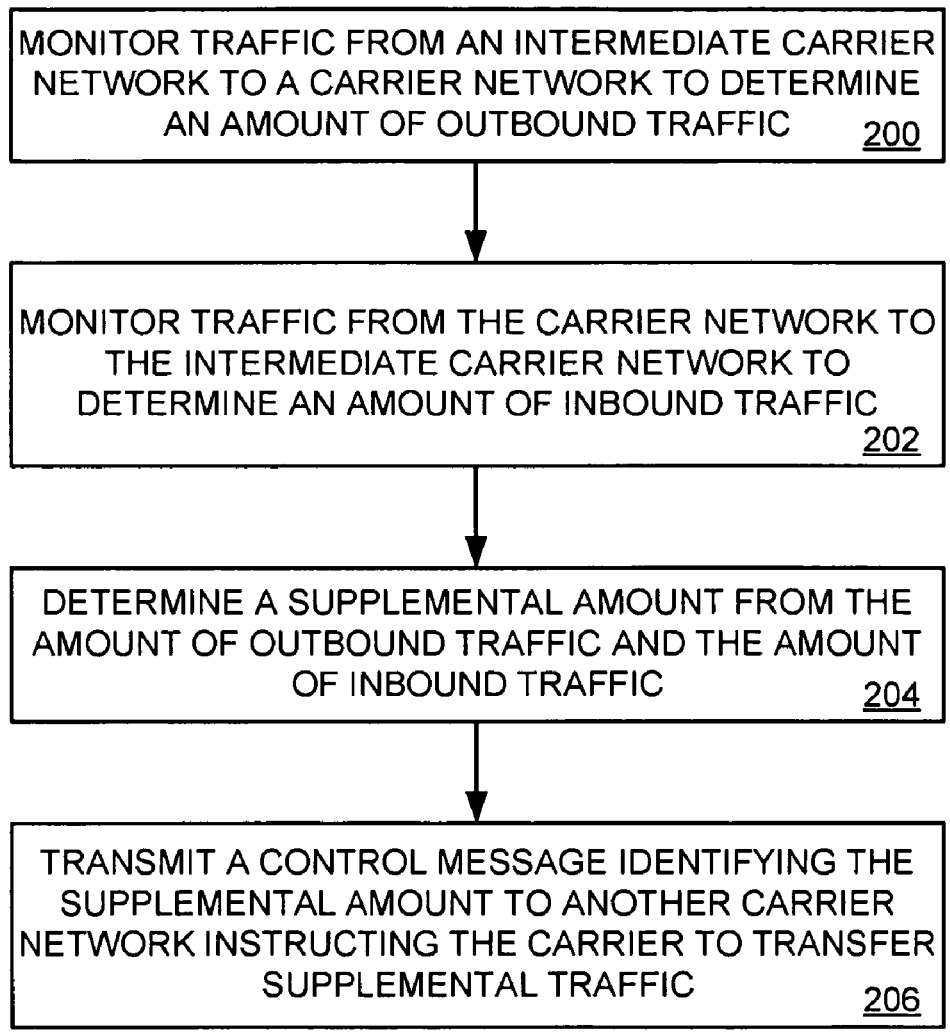
FIG. 2 illustrates the operation of the communication system.

FIG. 2 illustrates the operation of communication system 100. In this example, control module 104 monitors traffic from intermediate carrier network 102 to carrier network 106 to determine an amount of outbound traffic (operation 200). Control module 104 also monitors traffic from carrier network 106 to intermediate carrier network 102 to determine an amount of inbound traffic (operation 202).

Control module 104 determines a supplemental amount of traffic from the amount of outbound traffic and the amount of inbound traffic (operation 204). Control module 104 then transmits a control message identifying the supplemental amount to another carrier network 108 instructing the carrier to transfer supplemental traffic to intermediate carrier network 102 (operation 206). In fact, in most cases control module 104 will communicate with control module 110 to start the transfer of supplemental traffic.

Figure 3:
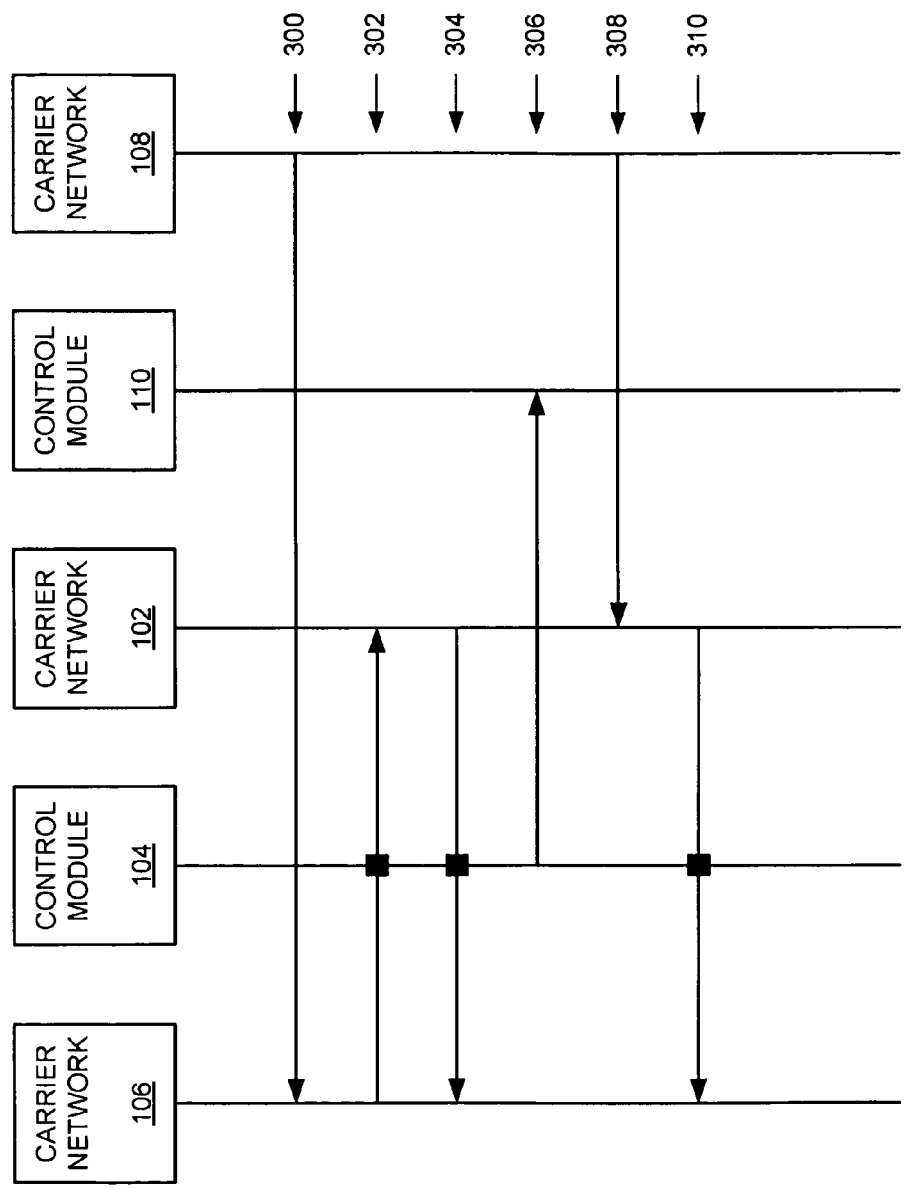
FIG. 3 illustrates the operation of the communication system.

FIG. 3 illustrates the operation of communication system 100. In this example, carrier network 108 transfers traffic to carrier network 106 over link 122 (operation 300). Control module 104 monitors traffic flowing from carrier network 106 to carrier network 102 (operation 302). Control module 104 also monitors traffic flowing from carrier network 102 to carrier network 106 (operation 304).

Control module 104 transmits a control message to control module 110 requesting a supplemental amount of traffic (operation 306). Carrier network 108 then transfers the supplemental amount of traffic to carrier network 102 (operation 308) and carrier network 102 then forwards the supplemental amount of traffic to carrier network 106 (operation 310).

Figure 4:
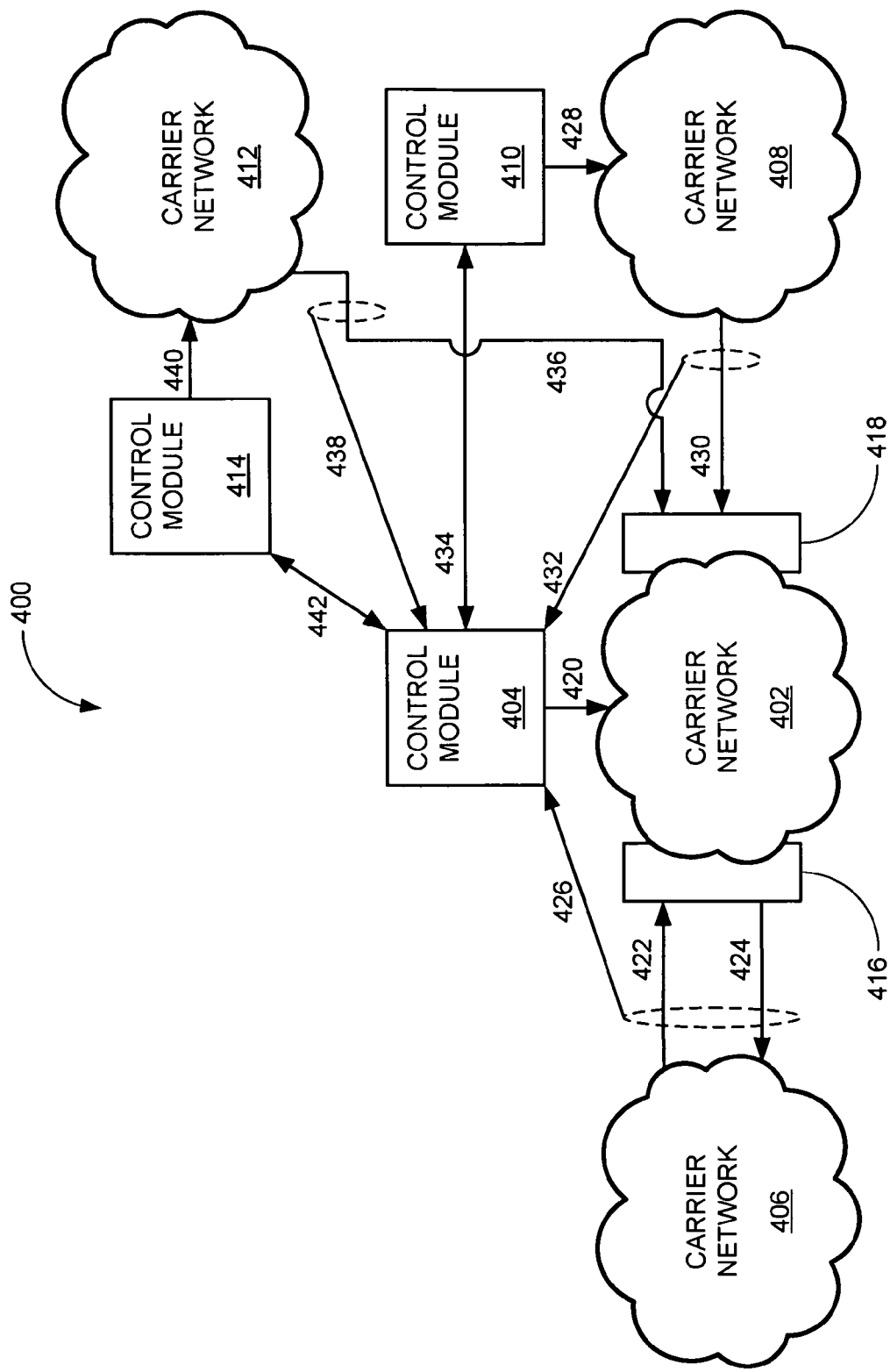
FIG. 4 illustrates a communication system.

FIG. 4 illustrates communication system 400. Communication system 400 is similar to communication system 100 with the addition of another carrier network and an associated control module. Communication system 400 includes carrier network 402, carrier network 406, carrier network 408, carrier network 412, control module 404, control module 410, and control module 414. Gateway 416 and gateway 418 are associated with carrier network 402. Information from carrier network 402 to carrier network 406 travels through gateway 416 and link 424. Information from carrier network 406 to carrier network 402 travels through link 422 and gateway 416. Information from carrier network 408 to carrier network 402 travels through link 430 and gateway 418. Information from carrier network 412 to carrier network 402 travels through link 436 and gateway 418.

Control module 404 is coupled to carrier network 402 through link 420. Control module 410 is coupled to carrier network 408 through link 428. Control module 414 is coupled to carrier network 412 through link 440. Control module 104 is coupled to control module 410 through link 434, and to control module 414 through link 442. Links 420, 428, 434, 440, and 442 could use various communication media, such as air, metal, optical fiber, or some other signal propagation path—including combinations thereof. These links could be direct links or they might include various intermediate components, systems, and networks.

Links 422, 424, 430, and 436 are high-speed, high-capacity, carrier-grade trunk lines interconnecting peering carrier networks 402, 406, 408, and 412. These high-performance connections may use various communication media, such as air, metal, optical fiber, or some other signal propagation path—including combinations thereof. They may be direct links, or they might include various intermediate components, systems, and networks. In some embodiments, these links are, or occur at internet exchange points (IX or IXP) and may include one or more network switches.

In this example, carrier network 402, carrier network 406, carrier network 408, and carrier network 412 are all owned and operated by different carrier entities. The operators of carrier network 402 and carrier network 406 have a peering agreement in place such that carrier network 406 will handle a given quantity of traffic from carrier network 402, and in return, carrier network 402 will handle a similar amount of traffic from carrier network 406. This allows both carriers flexibility in sending and receiving traffic over each other's networks.

Control module 404 monitors traffic between the different carrier networks through monitors 426, 432, and 438. Monitor 426 detects the volume of traffic flowing between carrier network 402 and carrier network 406, while monitor 432 detects the volume of traffic flowing from carrier network 408 to carrier network 402, and monitor 438 detects the volume of traffic flowing from carrier network 412 to carrier network 402. In some examples, this monitoring may actually occur in gateways 416 and 418.

In some circumstances, an imbalance in carrier traffic flowing between carrier networks may occur. For example, if carrier network 402 is handling 4 Gigabytes/second of traffic from carrier network 406 while sending only 1 Gigabyte/second of traffic to carrier network 406, there is a traffic gap of 3 Gigabytes/second that carrier network 402 may fill without additional cost according to the agreement. In this case the operators of carrier network 402 will look to balance the traffic flowing between carrier network 406 and carrier network 402 by increasing the amount of traffic flowing to carrier network 406.

One way to balance this traffic is to route traffic from a third party through carrier network 406 as part of the traffic from carrier network 402. In such a case, the operators of carrier network 402 may send a request to the operators of carrier network 408 asking them to provide traffic for carrier network 406 through carrier network 402, perhaps at a reduced cost. This request may be transmitted by control module 404 for carrier network 402 to control module 410 for carrier network 408 over link 434.

In detail, monitor 426 monitors traffic transferred from carrier network 402 (also called the intermediate network) to carrier network 406 (also called the first network) over link 424 to determine an amount of outbound traffic. Monitor 426 also monitors traffic transferred from carrier network 406 (the first network) to carrier network 402 (the intermediate network) over link 422 to determine an amount of inbound traffic. Control module 404 then determines a supplemental amount of traffic based on the amount of inbound traffic and the amount of outbound traffic. In one example, this supplemental amount may be thought of as a traffic gap corresponding to the difference between the amount of inbound traffic and the amount of outbound traffic. Other examples may calculate the supplemental amount in any of a wide variety of methods with the goal of balancing the inbound and outbound traffic. In some examples, the supplemental amount may be calculated as a bandwidth, while other examples may express the supplemental amount as a quantity of data.

Still other examples may not seek to actually balance the inbound traffic with the outbound traffic. For example, situations may exist where the peering agreement between the two carriers calls for an unbalanced exchange of traffic. In such a case, the supplemental amount would be related to the amount of additional outbound traffic required to maximize the amount of outbound traffic as allowed by the agreement.

Once the supplemental amount has been determined, control module 404 transmits a control message identifying the supplemental amount to control module 410, instructing the operator of carrier network 408 to transfer supplemental traffic in an amount less than or equal to the supplemental amount to carrier network 402 for forwarding to carrier network 406. This increases the amount of traffic carried over links 424 and 430. Control module 404 also may monitor the traffic flowing from carrier network 408 to carrier network 402 over link 430 via monitor 432.

In some cases, carrier network 408 may not have enough traffic for carrier network 406 to balance the traffic between carrier network 402 and carrier network 406. In order to balance the traffic, control module 404 then calculates a second supplemental amount based on the amount of inbound traffic, the amount of outbound traffic, and the amount of supplemental traffic received from carrier network 408. Control module 408 then transmits a control message to control module 414 requesting a second supplemental amount of traffic from carrier network 412 for forwarding to carrier network 406. Carrier network 412 then transfers a second supplemental amount of traffic to carrier network 402 over link 436. This increases the amount of traffic carried over link 436. Control module 404 also may monitor the traffic flowing from carrier network 412 to carrier network 402 over link 436 via monitor 438.

Figure 5:
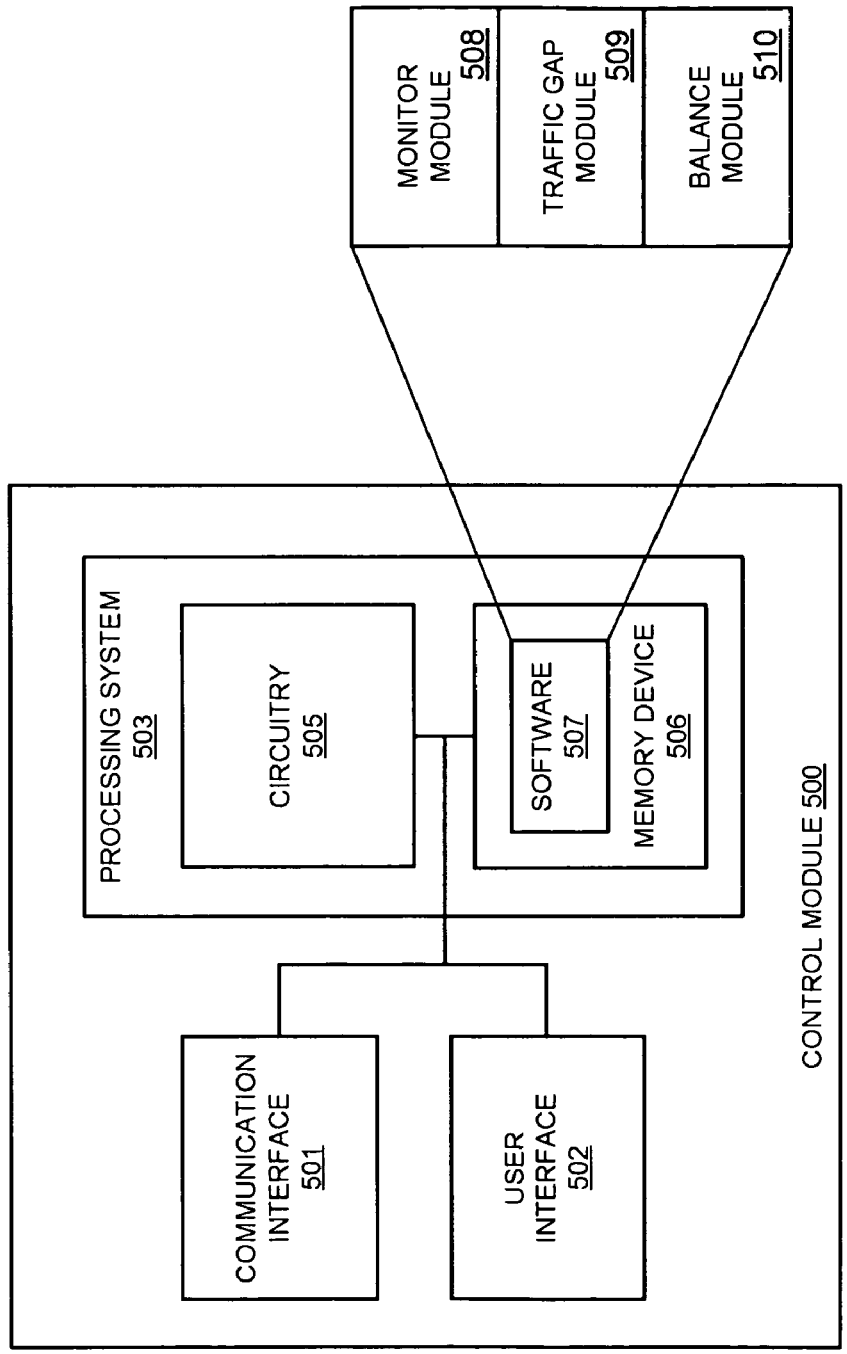
FIG. 5 illustrates a communication control module.

FIG. 5 illustrates control module 500. Control module 500 is an example of control module 104 or control module 404, although control modules 104 and 404 may use alternative configurations. Control module 500 includes communication interface 501, user interface 502 and processing system 503. Processing system 503 is linked to communication interface 501. Processing system 503 includes processing circuitry 505 and memory device 506 that stores operating software 507.

Communication interface 501 includes components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 includes components that interact with a user. User interface 502 may include a keyboard, display screen, mouse, touch pad, or some other user input/output apparatus. User interface 502 may be omitted in some examples.

Processing circuitry 505 includes microprocessor and other circuitry that retrieves and executes operating software 507 from memory device 506. Memory device 506 comprises a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software.

In this example, operating software 507 includes three software modules. Monitor module 508 contains instructions directing processing system 503 to monitor traffic from an intermediate carrier network to a carrier network to determine an amount of outbound traffic. Processing system 503 also monitors traffic from the carrier network to the intermediate carrier network to determine an amount of inbound traffic. Traffic gap module 509 directs processing system 503 to determine a supplemental amount of traffic from the amount of outbound traffic and the amount of inbound traffic. Balance module 510 directs processing system 503 to transmit a control message through communication interface 501 identifying the supplemental amount to another carrier network, instructing the carrier to transfer supplemental traffic.

In other examples, monitor module 508 also directs processing system 503 monitor the supplemental traffic from the second carrier network to the intermediate network to determine an amount of supplemental traffic. Traffic gap module 509 also directs processing system 503 to determine a second supplemental amount from the supplemental amount and the amount of supplemental traffic. Balance module 510 also directs processing system 503 to transmit a control message through communication interface 501 identifying the second supplemental amount to a third carrier network, instructing the third carrier network to transfer second supplemental traffic in an amount less than or equal to the second supplemental amount.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for allocating traffic between an intermediate network and a plurality of carrier networks comprising:
   a control module;
   a first gateway coupled with the control module, an intermediate network and a first carrier network; and
   a second gateway coupled with the control module, the intermediate network and a second carrier network;
   wherein the control module is configured to:
      monitor first traffic transferred from the intermediate network to the first carrier network through the first gateway to determine an amount of outbound traffic;
      monitor second traffic transferred from the first carrier network to the intermediate network through the first gateway to determine an amount of inbound traffic;
      determine a supplemental amount based on the amount of outbound traffic and the amount of inbound traffic; and
      transmit a control message that identifies the supplemental amount to the second carrier network instructing the second carrier network to transfer supplemental traffic in an amount less than or equal to the supplemental amount through the second gateway to the intermediate network.

2. The communication system of claim 1,
   wherein the second gateway is configured to receive supplemental traffic from the second carrier network and transfer it to the intermediate network; and
   wherein the first gateway is configured to receive the supplemental traffic from the intermediate network and transfer it to the first carrier network.

3. The communication system of claim 1 wherein the supplemental amount is the difference between the amount of inbound traffic and the amount of outbound traffic.

4. The communication system of claim 1 wherein the supplemental amount is measured as a bandwidth.

5. The communication system of claim 1 wherein the supplemental amount is measured as a quantity of data.

6. The communication system of claim 1 wherein the control module is further configured to:
   monitor the supplemental traffic from the second carrier network to the intermediate network through the second gateway to determine an amount of supplemental traffic.

7. The communication system of claim 6 wherein the control module is further configured to:
   determine a second supplemental amount from the supplemental amount and the amount of supplemental traffic; and
   transmit a control message that identifies the second supplemental amount to a third carrier network instructing the third carrier network to transfer second supplemental traffic in an amount less than or equal to the second supplemental amount.

8. The communication system of claim 7 wherein the sum of the second supplemental amount and the amount of supplemental traffic is less than or equal to the difference between the amount of inbound traffic and the amount of outbound traffic.

9. The communication system of claim 7,
   wherein the second gateway is also coupled to the third carrier network;
   wherein the second gateway is configured to receive second supplemental traffic from the third carrier network and transfer it to the intermediate network; and
   wherein the first gateway is configured to receive the second supplemental traffic from the intermediate network and transfer it to the first carrier network.

* * * * *